(12) United States Patent
Lyons et al.

(10) Patent No.: US 6,434,298 B1
(45) Date of Patent: Aug. 13, 2002

(54) QUANTUM OPTICAL METHODS OF AND APPARATUS FOR WRITING BRAGG REFLECTION FILTERS

(76) Inventors: Donald R. Lyons, 100 Richard Run, Yorktown, VA (US) 23693; James V. Lindesay, 4403, H St., SE., Washington, DC (US) 20019

( * ) Notice: Subject to any disclaimer, the term of this patent is extended or adjusted under 35 U.S.C. 154(b) by 0 days.

(21) Appl. No.: 09/578,164

(22) Filed: May 22, 2000

Related U.S. Application Data

(60) Provisional application No. 60/135,348, filed on May 21, 1999.

(51) Int. Cl.[7] ................................................. G02B 6/34
(52) U.S. Cl. ........................................... 385/37; 385/42
(58) Field of Search .......................... 385/37, 123, 124, 385/42; 430/321, 5

(56) References Cited

U.S. PATENT DOCUMENTS 6,284,437 B1 * 9/2001 Kashyap ...................... 385/37

OTHER PUBLICATIONS

"A Modeling and Observations of Phase–Mask Trapezoidal Profiles With Grating–Fiber Image Reproduction", Applied Optics, vol. 39, No. 7, pp. 1077–1083.

* cited by examiner

Primary Examiner—Phan T. H. Palmer
(74) Attorney, Agent, or Firm—Millen, White, Zelano & Branigan, P.C.

(57) ABSTRACT

Apparatus for and methods of providing Bragg reflection filters in a receptor such as an optical fiber uses a wavelength tunable phase mask made of a non-linear material into which an interference pattern is written by a pair of converging laser light beams. The interference pattern is probed with a reading beam of laser light that creates diffraction orders which are read into the receptor. By changing the wavelength and amplitude of the writing beams that create the interference region in the phase mask, the characteristics of the Bragg reflection filter written into the optical fiber can be changed. Accordingly, if the optical fiber is indexed along the wavelength tunable phase mask while the characteristics of the interference region are changed, thousands of different Bragg reflection filters can be formed in a single optical fiber.

25 Claims, 4 Drawing Sheets

QUANTUM OPTICAL METHODS OF AND APPARATUS FOR WRITING BRAGG REFLECTION FILTERS

RELATED PATENT APPLICATIONS

This application claims priority from U.S. Provisional Application Ser. No. 60/135,348 filed May 21, 1999, incorporated herein in its entirety by reference.

FIELD OF THE INVENTION

The present invention is directed to quantum optical methods of and apparatus for writing of Bragg reflection filters in optical waveguides and in micro-optic structures. More particularly, this invention is directed to such methods and apparatus for use in applications where a high degree of writing flexibility is needed and particularly when using pulsed laser systems configured for large volume Bragg reflection filter production for Dense Wavelength Division Multiplexing (DWDM).

BACKGROUND OF THE INVENTION

The present phase mask based technique for Bragg filter fabrication utilizes a mask made of a monolithic material such as fused silica glass. Phase masks are relatively expensive, presently ranging in cost from $2000 to $6,000 each depending upon custom requirements and the manufacturer. This is because they are pre-etched with parallel grooves of a given depth to produce an interference region from selected diffraction orders in the vacinity of the mask to provide a grating pattern in the form of a Bragg reflection filter in an optical fiber inserted into the same region. Each time it is desired to change the wavelength of the Bragg reflection filter using this technique, it is necessary to provide another phase mask at a cost in the thousands of dollars. Consequently, to provide an optical waveguide with a number of Bragg reflection filters rapidly becomes a very expensive proposition. Accordingly, there is a need for methods and apparatus for reducing the cost of providing optical waveguides with Bragg reflection filters of various characteristics.

SUMMARY OF THE INVENTION

It is a feature of the present invention to make laser systems, such as CW and pulsed laser systems, for large volume Bragg filter production tunable over a large number of wavelengths for single phase mask units.

In view of this feature, the present invention is directed to a method for fabrication of Bragg reflection filters by providing a wavelength tunable phase mask, in which the phase mask responds more strongly to a first wavelength of laser light than to a second wavelength of laser light. In practicing the method, first beams of laser light are directed into the phase mask unit at acute angles with respect to a reference line to create an interference region within the phase mask. A second beam of laser light is then directed into the interference region of the phase mask created by the first beams to generate diffraction orders. A receptor of a parasitic material is positioned optically proximate the tunable phase mask for writing Bragg reflection filters into the receptor with the diffraction orders that are produced by the interaction between the second beam and the optically altered or index of refraction modulated state of the tunable phase mask. According to the present invention, the characteristics of the Bragg reflection filters in the receptor are changed by altering the characteristics of the interference region created in the phase mask by altering the intensity, i.e., time-averaged square of the amplitude and Bragg angles of the first beams. In accordance with the process, the first beams serve as writing beams while the second beam serves as a reading beam which reads the phase mask pattern and produces a written interference pattern into the receptor to create a permanent Bragg reflection filter therein.

In accordance with the apparatus for practicing the aforedescribed method, the apparatus comprises a tunable phase mask which does not have a particular interference pattern fixed therein, but rather has a selected interference pattern created therein by the interference of two laser light beams directed into the phase material. The selected interference pattern can be changed by altering the characteristics of the laser light comprising the first beams. For example, by altering the Bragg angles and/or amplitude, i.e., intensity of the laser light, one can change the pitch of the phase mask and diffraction order amplitudes of the reading beam. In a specific example of the apparatus, laser light from a single first source is passed through a beam splitter to create two divergent beams. These divergent beams are then reflected from a pair of mirrors so as to converge at a selected interference region within the phase material to write or create a specific, temporary interference pattern therein. The written interference pattern in the phase mask is then read into the receptor to create a selected, permanent Bragg filter therein by the second laser light source.

In accordance with a first aspect of the invention, the receptor of the Bragg reflection filters is an optical waveguide in the form of an optical fiber. However, in other aspects of the invention, the optical waveguide can have other physical configurations and shapes and be made of various optical waveguide materials.

In accordance with one aspect of the invention, the phase mask is a non-linear solid structure similar to a lithium niobate crystalline material in its response to an intense laser beam, but more akin to highly non-linear glasses such as Pb/Si Silicates, Pb/Bi Gallates, Ti/Bi Gallates, Tellurites, Ti/Bi Germanates, Sulfides, etc. such as set forth in N. F. Borrelli et al., "Resonant and Non-Resonant Effects in Photomic Glasses", Journal of Non-Crystalline Solids 1850 (1995) 109–122, incorporated herein in its entirety by reference.

In still a further aspect of the invention, a phase mask may be quantum fluid material such as, for example, but not limited to, liquid helium. For any quantum fluid, i.e. a fluid system containing a super fluid and a normal fluid component, optical density fluctuations may be induced by the interaction of laser light with the normal and super fluid components.

BRIEF DESCRIPTION OF THE DRAWINGS

Various other features and attendant advantages of the present invention will be more fully appreciated as the same becomes better understood when considered in conjunction with the accompanying drawings, in which like reference characters designated the same or similar parts throughout the several views, and wherein.

DETAILED DESCRIPTION

Figure 1:
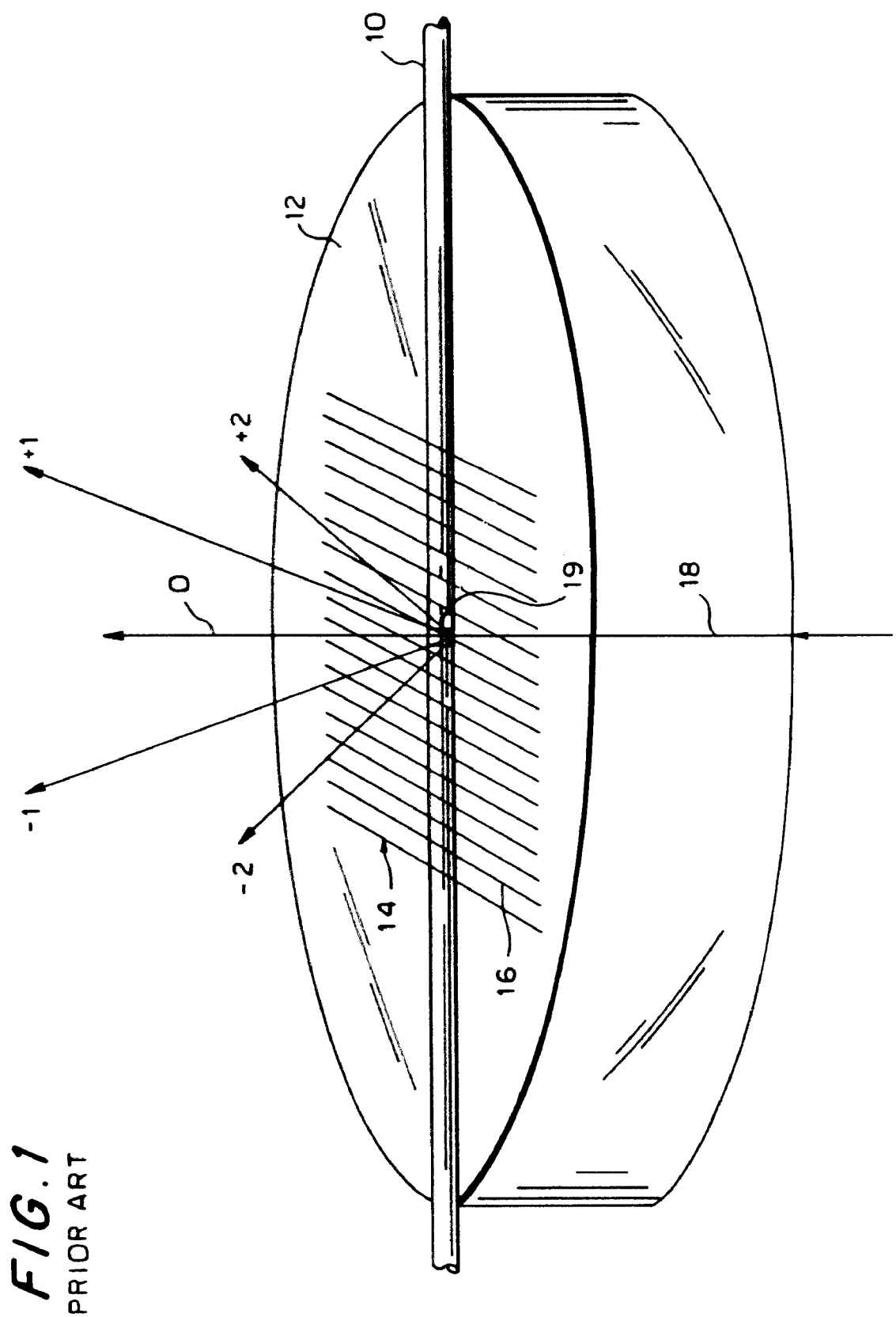
FIG. 1 is a side perspective view showing a prior art arrangement in which a phase mask has grid lines permanently written therein, to produce an interference pattern which is read into a receptor such as an adjacent optical fiber.

Referring now to FIG. 1 there is shown a prior art arrangement for reading a Bragg reflection filter into an optical waveguide in the form of an optical fiber 10' utilizing a phase mask 12, wherein the phase mask has a permanent interference pattern 14 in form of a grid 16 etched or otherwise formed thereon. Discussion of such a phase mask is set forth in D. R. Lyons et al., A Modeling Observations on Phase mask Trapezoidal Profiles with Grating-Fiber Imagery Production @ *Applied Optics* 39, number 7, 1077–1083 (March 2000), incorporated herein in its entirety by reference. The interference pattern 14 is read into the optical fiber 10' by a beam of laser light 18 which passes through the phase mask 12 and the optical fiber 10. Since the interference pattern 14 is fixed in the phase mask 10' for a given laser wavelength, the resulting writing-wavelength optimized Bragg reflection filter 19 in the optical fiber 10' cannot be changed without introducing a different phase mask with a different interference pattern. As was set forth in the background of the invention, phase masks are very expensive, costing as much as $6,000 each for a customized mask, due to its being a specialty item and is customarily made of monolithic silica based substrates.

Figure 2:
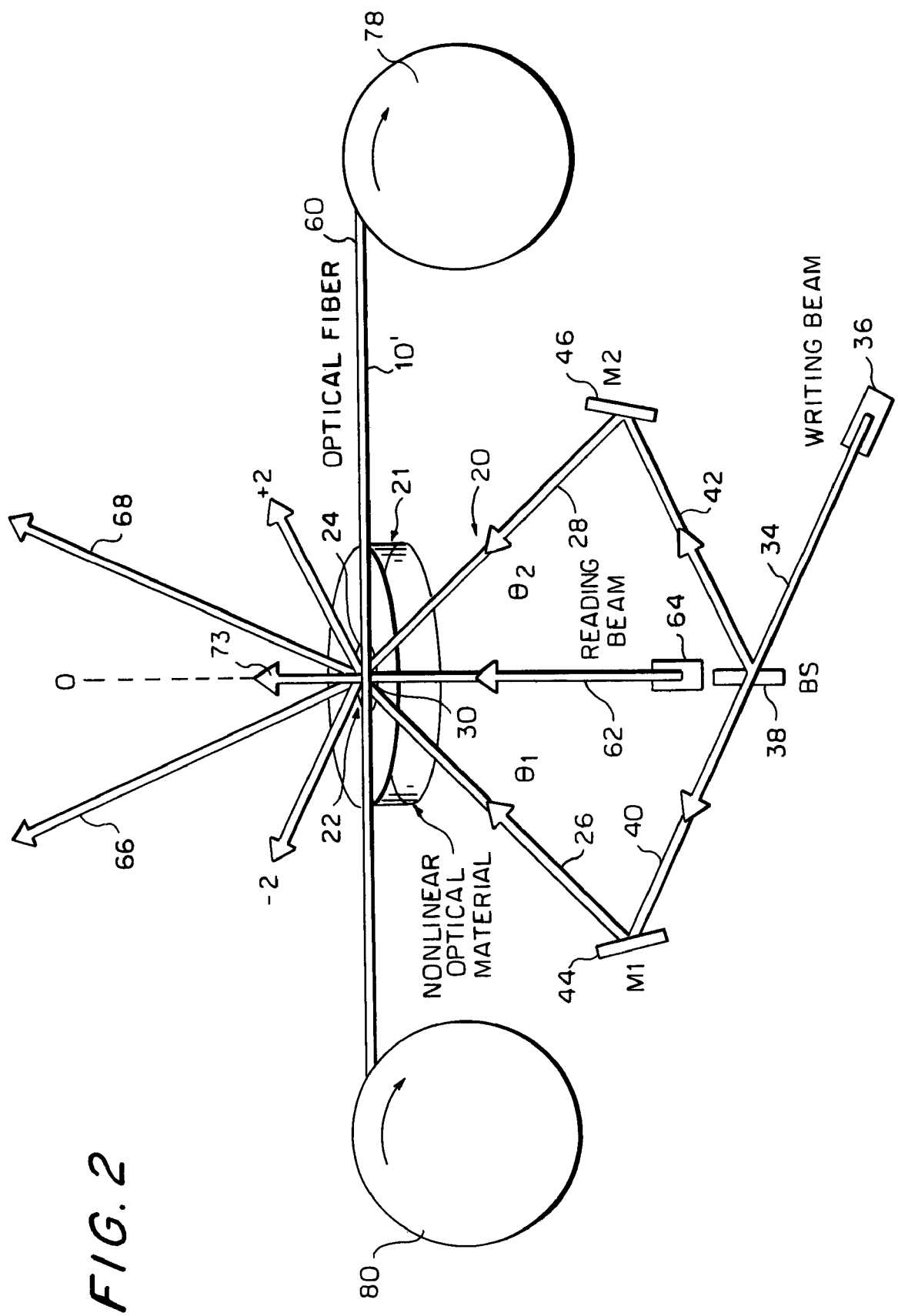
FIG. 2 is a side perspective view similar to FIG. 1 but showing the claimed invention in which the phase mask does not have a permanent interference pattern written therein but rather has a changeable interference pattern written therein to provide a tunable phase mask for reading an interference pattern into a receptor such as an adjacent optical fiber.
Figure 3:
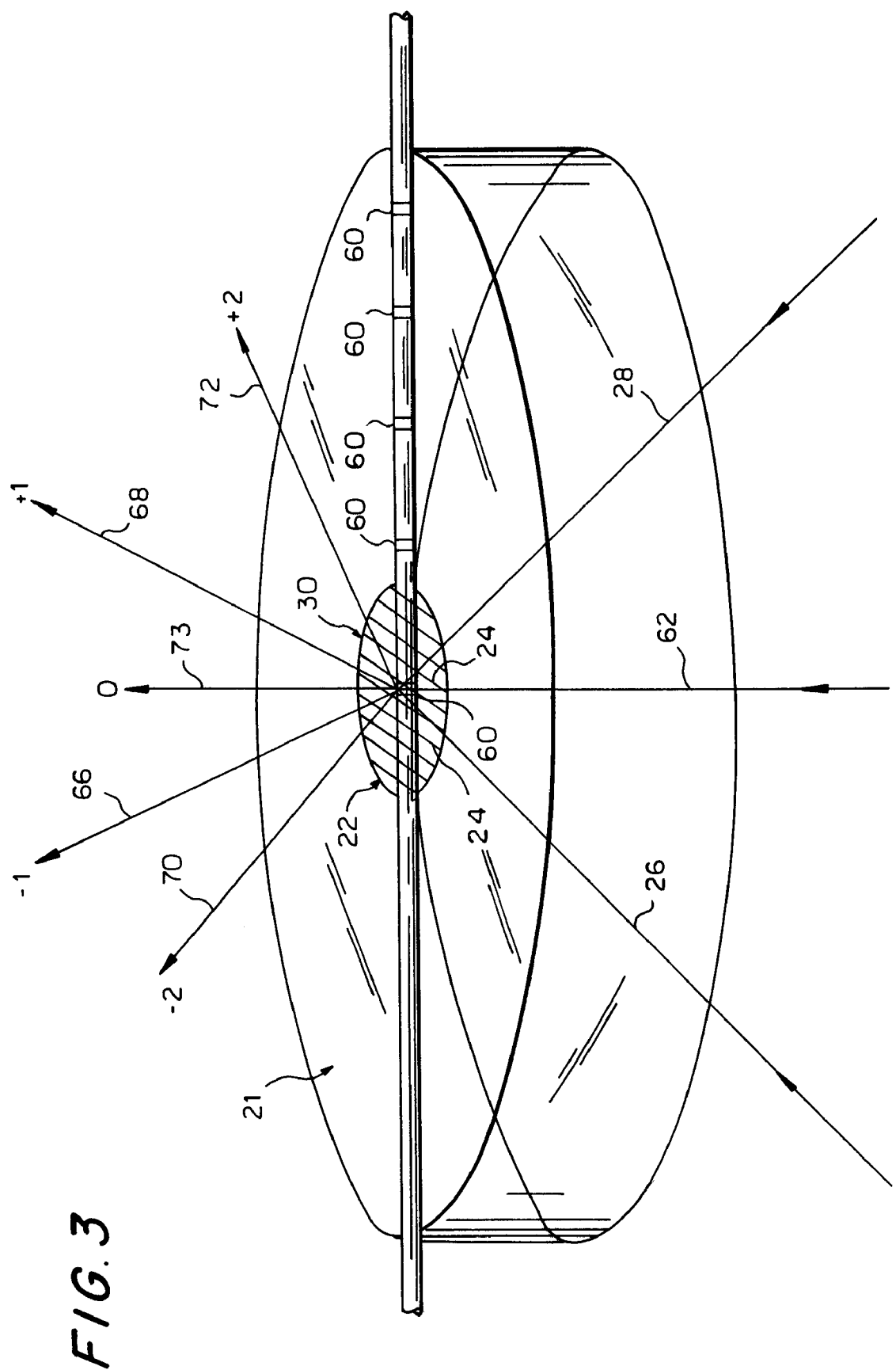
FIG. 3 is an enlarged perspective view of a portion of FIG. 2 showing a portion of the phase mask and optical fiber.

Referring now to FIGS. 2 and 3 which disclose the principles of the present invention, an optical fiber 10' is provided with Bragg reflection filters and apparatus 20 configured in accordance with the principles of the present invention, and used to practice the method of the present invention. The apparatus 20 comprises a phase mask 21 which is blank. It does not have interference pattern, such as the interference pattern 14 comprised of the phase gratings 16 permanently formed thereon as in FIG. 1. Rather, it has an interference pattern 22 comprised of lines 24 temporarily formed therein by the intersection of first laser light beams 26 and 28 of identical wavelength and amplitude impinging at an interference region 30 within the phase mask 21. The first beams 26 and 28 are therefore writing beams which write a temporary interference pattern 22 within the phase mask 21, by impinging at angles $\theta_1$ and $\theta_2$ with respect to a reference line 32 which is perpendicular to the surface of the phase mask 21.

The first beams 26 and 28 are created by a single laser light beam 34 which originates with a first laser light source 36. The beam 34 is split by a beam splitter 38 into two beams 40 and 42. The beam 42 is reflected from a first mirror 44 to provide the first laser light beam 26 while the beam 42 is reflected by a mirror 46 to provide the first laser light beam 28 which converges with the first laser light beam 26 in the interference region 30 to create the interference pattern 24.

In order to write a Bragg reflection filter 60 within the optical fiber 10' a second laser light beam 62 from a second laser light source 64 is directed through the interference region 30 to create diffraction orders such as the first order diffracted beams 66 and 68 and second order diffracted beams 70 and 72 as well as a zeroth order beam 73. In practicing the invention, the zeroth order beam 73 is suppressed by changing the amplitude of the first beams 26 and 28. The diffraction orders create the Bragg reflection filter 60 at a specific axial location within the optical fiber 10'. The characteristics of the Bragg reflection filter 76 are specifically related to the characteristics of the interference pattern 22 existing in the interference region 30 at the time the second laser light beam 62 passes through the interference region. These characteristics of the Bragg reflection filter 76 are therefore determined by selected variable characteristics of the first beams 26 and 28 which write the interference pattern 22. Characteristics which are readily manipulable to change the interference pattern 22 are the Bragg angles and the intensity of the laser light comprising the first beams 26 and 28 which write the interference pattern into the phase mask 21.

In order to generate a series of Bragg reflection filters 60 along the optical fiber as the optical fiber is advanced axially, the writing beam 34 is interrupted by conventional means such as, for example, a shutter 78 or by switching the laser light source on and off. The Bragg angles, intensity or both the Bragg angles and the intensity of the laser light beam 34 may be changed during the interruption so that the Bragg reflection filters 60 in the optical fiber 10' vary from one to the other. Accordingly, the optical fiber 10' can be provided with thousands of Bragg reflection filters along its length, the filters having variations which can number in the thousands. In order to facilitate this phenomenon, the material of the phase mask 21 should be such that when first laser light beams 26 and 28 are not impinging in the interference region 30, the Bragg reflection filters (which are in the form of holograms) are not created even though the second beam 62 or reading beam is applied continuously.

The tunable phase mask 21 is in one embodiment a non-linear material with certain characteristics similar to $LiNbO_3$ lithium niobate, $Rh:BaTiO_3$ rhodium-doped barium titanate, etc., but will be most suitably made from other materials. For example, the material can be a quantum fluid material such as liquid helium-four or any other quantum fluid material such as, for example, a superfluid with a normal fluid component so that optical density fluctuations may be induced in the fluid. The material comprising the phase mask 21 is a material which allows the laser light from the beams 26, 28 and 62 to pass therethrough. In the illustrated embodiment, the laser light is UV light, however, visible light and infrared light may also be used.

The optical fiber 10' is of the type which includes a cladding and a core wherein the hologram which provides the Bragg reflection filter usually occurs in the core but may possibly occur within the cladding. Typically, the optical fiber 10' is made of optical PMMA (polymethylmethacrylate) or other polymers or glasses.

The optical fiber 10' has many uses with Bragg reflection filters 76 formed therein, such as but not limited to, wavelength division multiplexers, laser mirrors for fiber lasers and fiber laser up-conversion, artificial nerves, and dispersion compensators. The optical fiber 10' is typically a glass or silica-based fiber doped with germanium, but it can also be doped with phosphorus, fluorine, erbium, ytterbium or other dopants.

The theory of operation of the apparatus 20 configured in accordance with the principle of the present invention, in order to practice the method of the present invention, relies on the tunable phase mask 21 which utilizes the non-linear dielectric character of its material to induce periodic variations in the local index of refraction of the material, which will then diffract the second beam 62 which is a writing beam.

The variations are induced due to interference of intense beams, represented by red laser beams 26 and 25, at angles $\theta_1$ and $\theta_2$ as shown in FIG. 2. The spacing is determined by the condition $w=\pi/(k\, n.\, \sin\theta)$. This spacing is tunable by varying the angle of the incident beam or the wavelength of the writing beams (first beams 26, 28). The dielectric constant varies with the intensity of the interfering first beams 26, 28 $\in = n_o^2 + \in' \cos^2(\pi y/w)$, where $\in'$ is dependent on the field intensity.

The probe beam (second beam 62) must satisfy Maxwell's equations within the medium, which now has a varying dielectric character represented as follows:

$$-\nabla[E\cdot V(\log \in)] - \nabla^2 E + (\in/c^2)\partial^2 E = 0$$

$$\nabla \in \times E - \nabla^2 B + (\in/c^2)\partial^2 E = 0$$

The equations are seen to be wave-like equations, and simplify if the polarization is chosen to be either perpendicular or parallel to the variations in the dielectric.

For the case explored, the polarization ($E_x$) is chosen perpendicular to the variations in the dielectric g(y). The field is expected to exhibit periodic behavior of the form $$Ex(y_1 z) = \Sigma G_m(z) e^{i(2m\pi y/w)}$$

(where the cosine squared behavior of the dielectric is expanded using double angle formulas). If the z-dependence is then assumed to be exponential $$G_m(z) = A_m e^{iqz} + F_m e^{-iqz}$$

then the differential equation for monochromatic beams becomes an eigenvalue equation for the eigenvalue wave vectors $q^2$, and degenerate eigenvectors $A_m$ and $F_m$. Expanding the dielectric in the form $\in = \in_0 + \in_1 \cos(2\pi y/w)$, the equation then satisfied by the coefficients is given by $$[\in_0(\omega/c)^2 - (2\pi m/w)^2 - q^2]A_m + (\in/2)[A_{m-1} + A_{m-1}] = 0$$

Once this equation is solved, the few remaining unconstrained coefficients must be chosen to satisfy the incoming and outgoing boundary conditions at the interfaces.

At this point it is convenient to choose the sample to be a photo-refractive material of substantial size in the x and y directions and of thickness D in the z direction. An incoming beam is incident in the direction corresponding to and incoming mode m, with angle given by $\phi = \sin^{-1}(2m_0\pi c/\omega w)$. For the polarization chosen, the electric field is solved for, and the magnetic field obtained from the solution using Faraday's law. The electric field as well as the magnetic field is continuous across both interfaces. These boundary conditions result in a set of equations for the reflection, transmission, and internal coefficients (A and F) for each mode (m) value.

For some materials, absorption will be a significant factor. It is assumed that this absorption is homogeneous, and will be modeled by losses due to ohmic currents induced in the material by the probe beam (second beam 62). These losses effectively modify the dielectric constant, giving an imaginary component to this effective dielectric.

$$\in_{eff} = \in + i 4\pi\sigma/\omega = \in + I\, n^2[(2(nk\delta)^2 + 1)^2 - 1]^{1/2}$$

where n is the index of refraction of the material and $\delta$ represents the penetration depth for the amplitudes (twice the penetration depth for the intensity), Substitution of this form into the previous equations models an absorptive medium, which satisfies the appropriate boundary conditions.

The tunable phase mask unit 21 in one embodiment is a monolithic wafer of non-linear optical material with the property that it strongly responds to one wavelength of laser light from first beams 26 and 28 while it weakly (less strongly) responds to another wavelength from the second beam 62. There is, however, a definite relationship between the response of the weaker second laser beam 62 to the material because of the non-linear interaction of the first act of strong laser beams 26 and 28 with the material. It is important to note at this point that the strong interaction is mediated by a resonant response of the material to a particular writing beam wavelength of first beams 26 and 28. Consequently, when this stronger resonant laser 36 is turned off, the (Reading) or probe beam 62 no longer sees a perturbed index of refraction (periodic index modulation).

A second materials requirement, though not as strict as the first, is that the optical fiber 10' have a high damage threshold specifically when the photo-induced response of the 'parasite material' is in the UV region of the electromagnetic spectrum. This is the material in which the Bragg reflection filter resides in a permanent sense. This requirement affects both phase mask material lifetime as well as Bragg filter writing efficiency. Finally, a third strict requirement of the device is that the non-linear response of the device vanishes when the writing first laser 36 is turned off.

Figure 4:
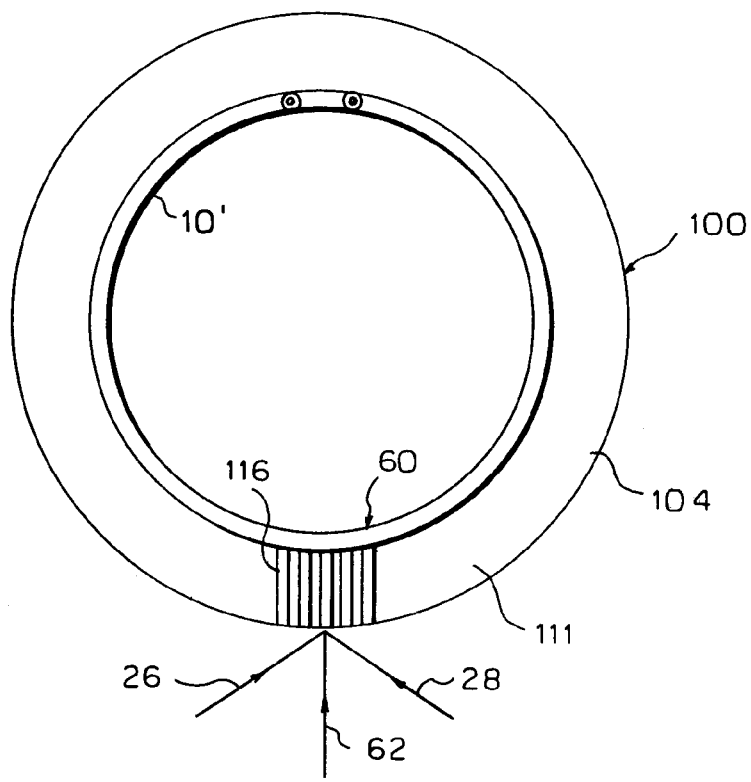
FIG. 4 is a side view showing an annular phase mask containing a quantum fluid having an interference pattern written therein.
Figure 5:
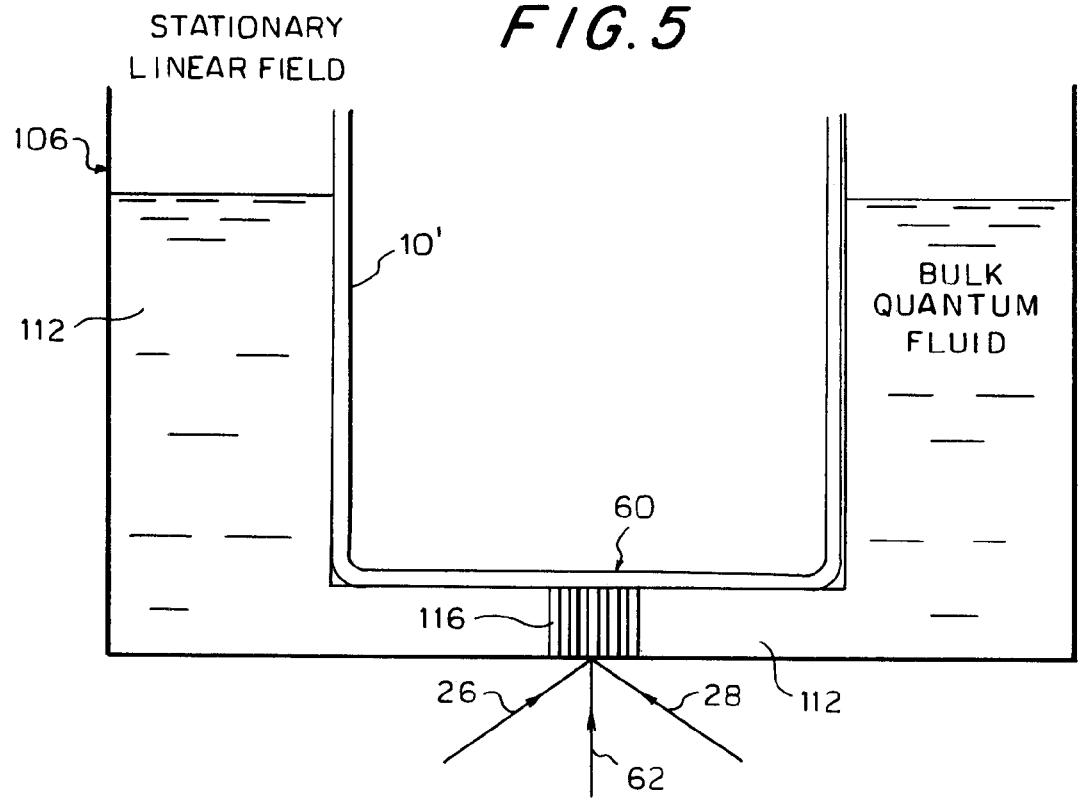
FIG. 5 is a side view showing a phase mask of another configuration containing a quantum fluid having an interference pattern written therein.

Referring now to FIGS. 4 and 5, the interferometric device 100 represented by the quantum loop 102 of FIG. 4 takes advantage of the macroscopic quantum wavefunction of a superfluid such as, for example, the superfluid component of liquid helium to establish stationary spatially varying optical properties within a liquid medium 104. On the other hand, as seen in FIG. 5, a stationary linear field device 106 establishes quantum variations within a region 108 of direct application of radiation from the first beam 26 and 28. These configurations of the devices utilize either a superleak 11 1 of FIG. 4 (normal fluid fixed) or a bulk fluid channel 112 of FIG. 5 as regions for application of a laser interference pattern 116 created by writing first beams 26 and 28.

A nonlinear optical material is constructed out of a quantum fluid, like $^4$He below the lambda point. It is known that the superfluid component carries no entropy, and that the normal fluid component can be locked due to its viscosity in a super leak. The superfluid component is accelerated from regions of high chemical potential towards regions of lower chemical potential, and tends to flow towards regions of higher temperature since the ratio of the superfluid density to the normal fluid density decreases with increasing temperature. Generally the bulk superfluid helium system supports no stationary temperature gradients, and such gradients will only persist within superleaks. These unique properties allow one to optically affect the properties of the superfluid, and for the affected superfluid to likewise affect the optical transmission and reflection of impinging radiation.

Within a superleak, the normal fluid is locked ($v_n = 0$), and the superfluid component will be expected to satisfy $$\frac{D\overline{v_s}}{Dt} = 0$$

which implies that $$\frac{dP}{dx} = \frac{\rho\sigma}{m_{He}}\frac{dT}{dx}$$

giving expected density variations which satisfy $$\rho(x) = \rho_0 \exp\left[\frac{\sigma}{m_{He}u_1^2}(T(x)-T_0)\right]$$

For $^4$He the parameters are approximately $$\frac{\sigma}{m_{He}u_1^2} \approx 2\times 10^{-3} \text{ per } {}^\circ K.$$

which indicates small expected density variations induced by reasonable temperature profiles. Within a stationary bulk superfluid one expects no linear material flow, and can therefore assume that the viscous effects of the normal fluid will be minimal. The relative density variations induced by the optical radiation are thus expected to satisfy $$\rho^2(x) - \rho_0^2 \cong \frac{\rho}{\rho_s}\left[\frac{\alpha' m_{He}}{4K\sigma u_1}\sin(2Kx)\right]^2$$

where $K=\pi/$(pattern spacing) is related to the Bragg pattern spacing induced in the fluid and $\alpha'$ is the delivered entropy gain in power/(volume °K). For a 20 watt laser beam delivered into a cubic millimeter, we expect $\delta\rho/\rho\sim 1$. That is, we expect that the density variations could be of the order of 1, which would significantly affect an optical probe beam 62 (or reading beams) being launched into the pattern created by the writing beams 26 and 28.

Several implications of the quantum mechanical system described above come out of the fact that using light to modify the material properties of the quantum fluid changes its mechanical properties. Because there are no dissipative loses this could allow the system to sensitively detect its mechanical orientation as well as deviations in its thermal state (thermal fluctuations). Consequently, there are uses for the interferometric device of FIGS. 4 and 5 in addition to reading Bragg reflection filters into optical fibers 10'.

From the foregoing description, one skilled in the art can easily ascertain the essential characteristics of this invention and, without departing from the spirit and scope thereof, can make various changes and modifications of the invention to adapt it to various usages and conditions.

What is claimed:

1. An apparatus for the fabrication of Bragg reflection filters, comprising;
   a wavelength tunable phase mask made of a non-linear optical material;
   a first laser light source for providing first beams of laser light of a first wavelength, the first beams being directed into the wavelength tunable phase mask to create an interference region within the wavelength tunable phase mask;
   a second laser light source for providing a second beam of laser light of a second wavelength, the second beam being directed into the interference region of the wavelength tunable phase mask created by the first beams to generate diffraction orders; and
   a receptor made of a parasitic material optically positioned proximate the wavelength tunable phase mask for reading the diffractions order into the receptor with the second laser light source to create a Bragg reflection filter therein.

2. The apparatus of claim 1 wherein the non-linear optical material of the wavelength tunable phase mask responds more strongly to the first wavelength of laser light than to the second wavelength of laser light.

3. The apparatus of claim 2 wherein the wavelength tunable phase mask is configured of a non-linear optical material having a resonant response to the first wavelength whereby when the first source providing the first beams is turned off, the second beam no longer encounters a perturbed index of refraction and does not write a Bragg reflection filter into the receptor.

4. The apparatus of claim 3 wherein the wavelength tunable phase mask is configured of a monolithic wafer of a non-linear optical material.

5. The apparatus of claim 4 wherein the wafer is made of a solid material.

6. An apparatus of claim 3 wherein the material is a quantum fluid material.

7. The apparatus of claim 6 wherein the quantum fluid material is comprised of liquid helium.

8. The apparatus of claim 1 further including a beam splitter for creating two first beams from the first source and first and second mirrors for reflecting the two first beams into the interference region.

9. The apparatus of claim 1 wherein the light emitted by the first and second laser light sources is unfrared light.

10. The apparatus of claim 1 wherein the first and second laser light comprises CW laser light.

11. The apparatus of claim 1 wherein the first and second laser light comprise pulsed laser light.

12. The apparatus of claim 1 wherein the wavelength tunable phase mask is made of a material selected from the group consisting of lithium niobate, rhodium-doped barium titonate and liquid helium-four.

13. The apparatus of claim 1 wherein the wavelength tunable phase mask is made of a material selected from the group consisting of Pb/Si silicates, Pb/Bi gallates, Ti/Bi gallates, tellurites, Ti/Bi germanates and sulfides.

14. The apparatus of claim 1 wherein the light emitted by the first and second laser light sources is UV light.

15. The apparatus of claim 1 wherein the light emitted by the first and second laser light sources is visible light.

16. A method for creating Bragg reflection filters in a receptor comprising:
    positioning the receptor in optical proximity with a wavelength tunable phase mask made of a non-linear optical material;
    directing first beams of laser light of a first wavelength into the wavelength tunable phase mask to create an interference region within the phase mask; and
    directing a second beam of laser light of a second wavelength through the interference region of the wavelength tunable phase mask and through the receptor to create diffraction orders which pass into the receptor to create a Bragg reflection filter within the receptor.

17. The method of claim 16 further including the step of creating Bragg reflection filters of different characteristics in the receptor by changing the position of the receptor with respect to the wavelength tunable phase mask and changing the laser wavelengths, Bragg angles, or the intensity the first beams to create different Bragg reflection filters at different locations within the receptor.

18. The method of claim 17 wherein the receptor is an optical fiber and wherein the optical fiber is advanced over the phase mask while the interference region in the wavelength tunable phase mask is changed to distribute different Bragg reflections in the optical fiber at different axial locations.

19. The method of claim 16 wherein the wavelength tunable phase mask is made of a material selected from the group consisting of lithium niobate, rhodium-doped barium titonate and liquid helium-four.

20. The method of claim 16 wherein the light emitted by the first and second laser light sources is UV light.

21. The method of claim 16 wherein the light emitted by the first and second laser light sources is visible light.

22. The method of claim 16 wherein the light emitted by the first and second laser light sources is unfrared light.

23. The method of claim 16 wherein the first and second laser light comprises CW laser light.

24. The method of claim 16 wherein the first and second laser light comprises pulsed laser light.

25. The method of claim 16 wherein the wavelength tunable phase mask selected from the group consisting of Pb/Si silicates, Pb/Bi gallates, Ti/Bi gallates, tellurites, Ti/Bi germanates and sulfides.

* * * * *